March 17, 1953 W. McK. MARTIN 2,631,628
APPARATUS FOR PEELING FRUIT OR VEGETABLE PRODUCTS
Filed Feb. 5, 1949 3 Sheets-Sheet 1
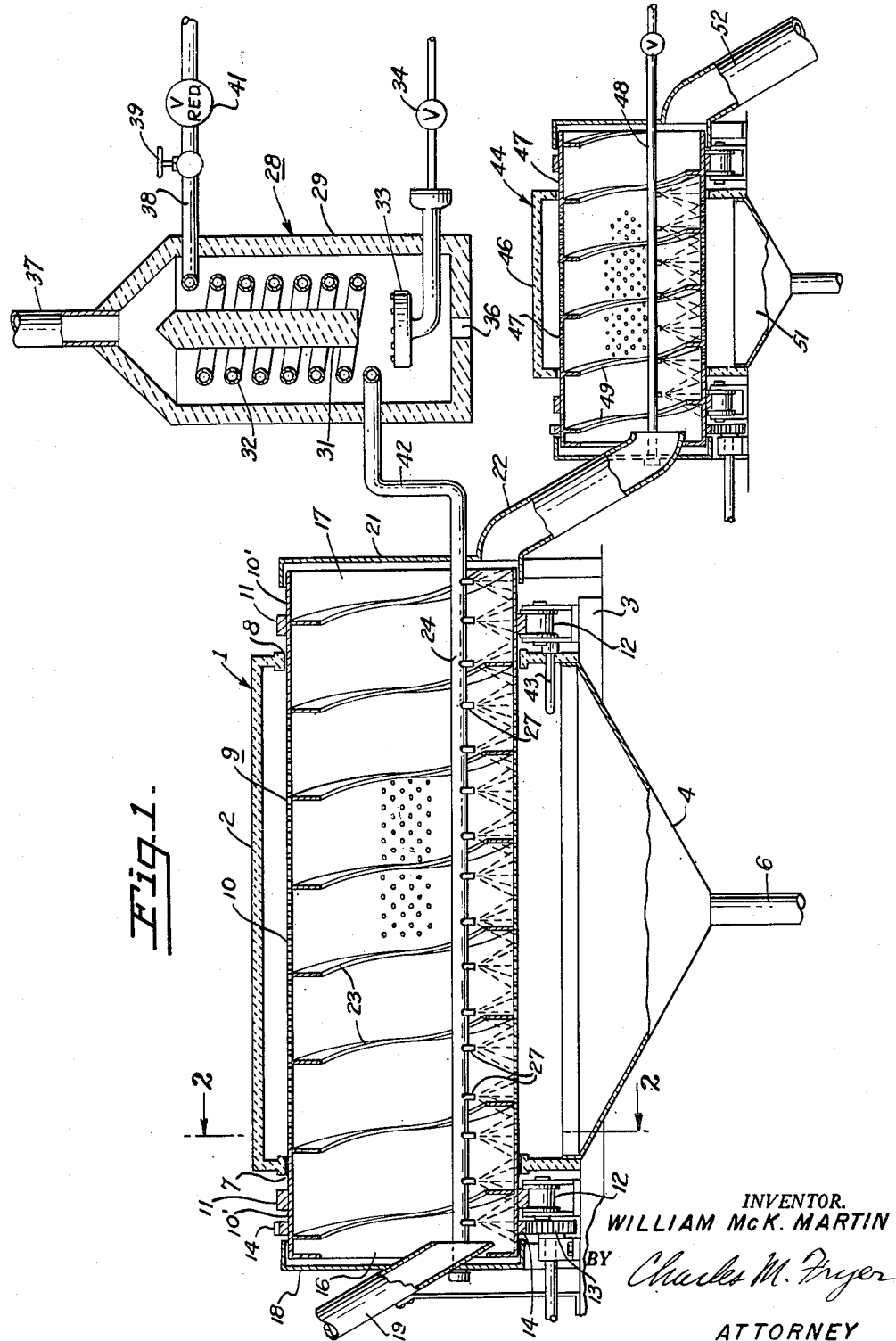
INVENTOR.
WILLIAM McK. MARTIN
BY Charles M. Fryer
ATTORNEY March 17, 1953   W. McK. MARTIN   2,631,628
APPARATUS FOR PEELING FRUIT OR VEGETABLE PRODUCTS
Filed Feb. 5, 1949   3 Sheets-Sheet 2

INVENTOR.
WILLIAM McK. MARTIN
BY Charles M. Fryer
ATTORNEY

March 17, 1953  W. McK. MARTIN  2,631,628
APPARATUS FOR PEELING FRUIT OR VEGETABLE PRODUCTS
Filed Feb. 5, 1949  3 Sheets—Sheet 3

INVENTOR.
WILLIAM McK. MARTIN
BY Charles M. Fryer
ATTORNEY

UNITED STATES PATENT OFFICE 2,631,628

APPARATUS FOR PEELING FRUIT OR VEGETABLE PRODUCTS

William McK. Martin, San Mateo, Calif., assignor to James Dole Engineering Co., a corporation of Nevada Application February 5, 1949, Serial No. 74,811

1 Claim. (Cl. 146—47)

My invention relates to the peeling of fruit or vegetable products, and more particularly to the removal of skin from such products by an apparatus and method embodying the employment of superheated steam.

It is known that the skins of various fruit and vegetable products, such as carrots, potatoes, beets, peaches, apricots and tomatoes, may be loosened to the extent that they may be easily removed therefrom, by subjecting the product for a relatively short time to steam at a temperature sufficiently above 212° F. to effect the skin loosening. Such temperature will generally be above 600° F. and below 900° F., depending upon the particular type of product. The time of steam treatment will also vary from about 20 to 100 seconds depending upon the particular product.

The relatively short period of time to which the product is subjected to the steam and the high temperature of the steam result in the loosening of the skin without cooking of the meat of the product, which is extremely important in certain food processing operations. The steam imparts heat rapidly to the product because it condenses thereon during the treatment and imparts its high heat of vaporization thereto. This is an important factor in effecting the skin loosening without cooking of the product.

With present equipment for accomplishing the above described effect, it is necessary to employ a pressure retort wherein the steam is maintained at superatmospheric pressure in order that it may be sufficiently above 212° F. to loosen the skin from the product. This necessitates heavy equipment capable of withstanding the high pressure; and if the process is continuous, special inlet and outlet valves are required to introduce the product into the retort and allow it to be removed therefrom, without loss of pressure in the retort. Otherwise the pressure would fall to atmospheric pressure at which the steam could exist only at substantially 212° F. Such type of equipment is, hence, necessarily cumbersome and costly.

My invention has as its objects, among others, the provision of an improved apparatus and method for peeling skins from fruits or vegetables, which are simple, inexpensive and easy to operate, and in which superheated steam is employed to loosen the skin at substantially atmospheric pressure. Other objects will become apparent from a perusal of the following description.

I have found that the peeling can be effected by the steam at substantially atmospheric pressure, by utilizing superheated steam as the skin loosening medium. In superheating the steam, outside heat is imparted thereto; and it may be heated to as high a temperature as may be required to produce the skin loosening at atmospheric pressure. Hence, the skin loosening may be effected in an enclosure or housing which is unsealed to the atmosphere and in which the entrance for the product and the exit therefor need not be supplied with special valve mechanism to maintain pressure within the housing. This makes for a simple and economical apparatus and method. Any suitable superheating means may be employed for superheating the steam to the desired temperature. The superheater may be associated with the boiler or it may be associated with the apparatus in the form of a gas burner, or electrical heating means.

Although the skin loosening may be effected in a more or less static environment of the superheated steam, I find that the action is more efficacious if the steam is impinged against the product by means of jets through which the steam may be ejected at a sufficiently high pressure to be sprayed directly against the product, as this causes some of the skin to be removed. A suitable ejection pressure depending on whether the product is relatively hard such as carrots, or relatively soft as tomatoes, may vary from about 15 lbs. to 20 lbs. gauge pressure per square inch, although this value is not particularly critical.

As soon as the ejected steam enters the housing, the pressure will fall down to atmospheric pressure, and the temperature will be lowered accordingly, but sufficient heat is imparted to the steam by the superheater to provide the desired skin loosening temperature at atmospheric pressure. Upon entering the housing, the steam provides a desirable non-oxidizing atmosphere therein, because as it flows outwardly through any openings in the housing, it prevents inflow of outside air into the housing and also displaces all air originally in the housing.

Where the type of product is relatively hard, such as carrots and potatoes, I preferably agitate the product as it is conveyed relative to the steam jets, so that the entire surface of the product is subjected to the impinging steam to enhance thorough loosening of the skin. For softer products, such as tomatoes, agitation may not be desirable because it may result in bruising of the product, and can be omitted.

As previously mentioned, the length of steam treatment and the temperature of the superheated steam may vary for the particular product being peeled. Thus, in the case of carrots, I have found that steam superheated so that it will have a temperature of about 700° F. to 750° F. at atmospheric pressure is satisfactory, and that subjecting the carrots to the superheated steam for about 20 to 40 seconds will result in sufficient loosening of the skin to enable the skin to be readily removed by a subsequent washing operation. For potatoes, the superheated steam temperature may be about the same as that for carrots, but the steaming takes a longer time, as potato skins loosen less readily. A time of 60 to 90 seconds is satisfactory for the steaming. The length of time of the steaming and the temperature will, of course, vary with the particular kind of product, as was previously indicated, and with the physical character of any given product, as products even of the same kind may vary in characteristics from time to time and season to season. However, these factors can be readily determined from the circumstances.

My method permits of continuous operation; and for this purpose, the product is conveyed from the entrance to the exit of the housing structure into which the superheated steam is introduced, by means of suitable conveyor mechanism, the steam jets being positioned adjacent the conveyor mechanism to cause the steam fluid to impinge against the product for the purpose previously stated. The conveyor mechanism discharges the skin loosened product from the exit of the housing; and the loosened skin is then removed by being washed with water. In the case of harder products, such as carrots, which will not be readily injured by pressure washing, the washing is efficaciously accomplished by spraying jets of water under a relatively high pressure of about 60 lbs. to 150 lbs. per square inch, depending on the physical character of the product, against the skin loosened product while simultaneously agitating the product relative to the water spray to expose all of the surface of the product to the spray to enhance removal of the skin.

In the case of softer products, such as tomatoes, a water spray under sufficient pressure to remove the skin may bruise the product. However, the skin may be readily removed by passing the product after it has been skin loosened by the steaming, through a water bath in which some of the skin will be partially removed. The rest of the skin can be readily removed by hand as the product is conveyed from the water bath along the usual inspection belt common in food processing plants.

Reference is now made to the drawings for a more detailed description of preferred embodiments of my invention:

Fig. 1 is a more or less schematic longitudinal section of an embodiment of the apparatus for the peeling of skin from relatively hard products, such as carrots;

Figure 2:
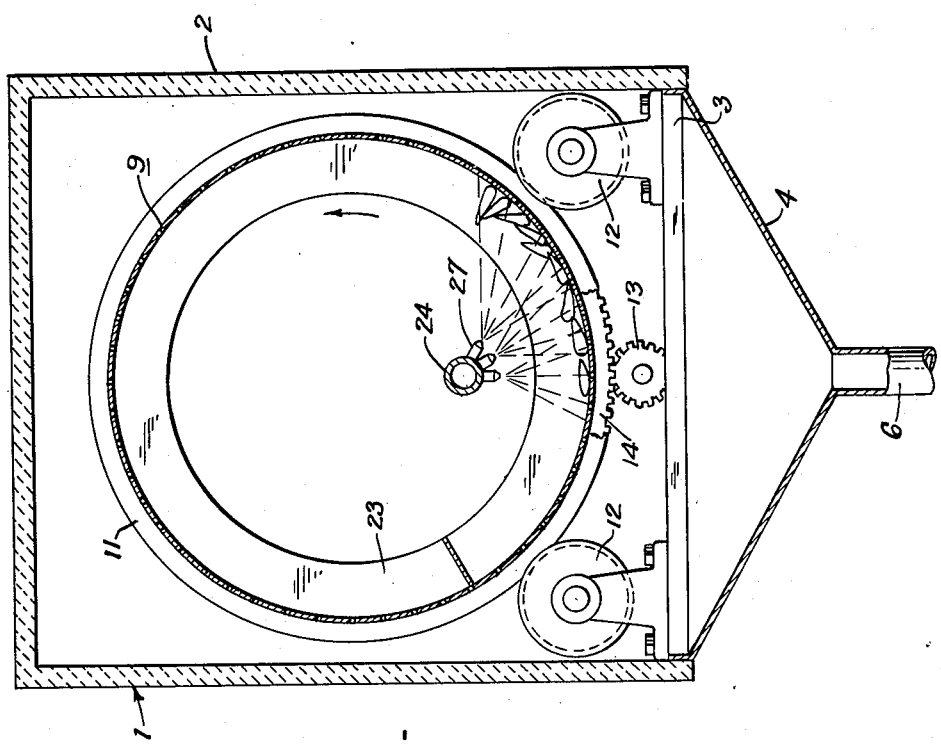
Fig. 2 is a transverse vertical section taken in a plane indicated by line 2—2 in Fig. 1.

With reference to the embodiment of Figs. 1 and 2 adapted for relatively hard products, such as carrots, potatoes and beets, the apparatus comprises a steamer 1 having housing 2 supported on a suitable frame structure 3. Connected to the bottom of housing 2 is a funnel shaped drain basin 4 having a drain outlet 6 from which steam condensate may escape. At one end, housing 2 is provided with an entrance opening 7 and at the opposite end with exit opening 8. Extending longitudinally of the housing and projecting through openings 7 and 8 is a foraminated cylinder 9, the cylindrical wall of which is preferably in the form of an intermediate screen portion 10 secured to imperforate reenforcing end walls 10', but which may be of any other suitable foraminated construction to allow drainage of steam condensate therethrough. The openings in the cylinder are small enough to preclude passage of the product therethrough.

Cylinder 9 is mounted in housing 2 for rotation about its axis by means of a circular band 11 secured about each projecting end of the cylinder, and which is supported on spaced idler rollers 12; the drive to rotate the cylinder being through drive pinion 13 driven by any suitable source of power (not shown) and which meshes with driven gear 14 secured to one of the projecting ends of the cylinder. One end of the cylinder provides an entrance opening 16 for the passage of product into the cylinder while the opposite end provides an exit opening 17 for the discharge of the product. Entrance opening 16 is provided with a stationary cover plate 18 through which extends a chute conveyor 19 for introducing the product into the cylinder. It is desirable that the product be washed with water before it is introduced into the apparatus; and any suitable washing mechanism (not shown) may be utilized, from which chute 19 discharges the product into the cylinder. At its exit, cylinder 9 is provided with a stationary cover plate 21 and discharge chute 22.

For conveying the product through cylinder 9 and through housing 2 as the cylinder is rotated, the interior surface of the cylinder is provided with a continuous screw or helical conveyor 23 extending the length of the cylinder. Not only does the conveyor move the product through the cylinder, but as can be seen from Fig. 2, agitation of the product is effected as the cylinder is rotated because the product will be carried partially up the wall of the cylinder by the rotation until it is moved to a position exceeding its angle of repose, and then it will fall down, thus resulting in a continuous tumbling action or agitation.

Means is provided for spraying jets of superheated steam to impinge against the product as it is conveyed under agitation through the cylinder, comprising stationary pipe 24 extending within and longitudinally of the cylinder, and which is fixedly supported at its ends in cover plates 18 and 21. Pipe 24 is positioned relatively close to the conveyor; and along its length it is provided with spaced sets of downwardly directed jets or spray nozzles 27 adjacent the product and the conveyor. As can be seen from Fig. 2, the jets 27 of each set are closely adjacent and diverge substantially radially from pipe 24 so as to be disposed angularly relative to each other, to cause the superheated steam or fluid to impinge against the product over the entire space or area of support on the interior wall of the cylinder. This coupled with the agitation effected by the rotation of the cylinder insures that the product will be thoroughly acted upon by the steam spray to result in efficacious loosening of the skin. Although it is preferred to position pipe 24 within the cylinder as this permits downwardly directed jets of the steam, the pipe may be located underneath the cylinder outside thereof with upwardly directed jets.

The cylinder is rotated at the desired speed adapted to provide the desired relatively short time interval for the steaming treatment previously described; and such speed of rotation will vary depending upon the particular type of product being treated. Also, the steam pressure from jets 27 and the steam temperature effected by the superheating thereof will vary with the particular product. Any suitable means may be employed for applying outside heat to the steam to superheat the same. The superheater may be positioned at the boiler of the plant, or if desired it may be remote from the boiler.

In Fig. 1, I have illustrated a gas burner superheater 28 comprising insulated chamber 29 having interior insulated dividing wall 31 about which is a steam coil 32. Underneath coil 32 is a gas burner 33 having gas inlet control valve 34. A combustion air opening 36 is provided in the bottom of the superheater, and a flue 37 is provided at the top for escape of the products of combustion. Coil 32 is connected by steam inlet piping 38 to the source of steam generation or boiler (not shown), and a hand control valve 39 for adjusting the quantity of steam flow to the superheater is provided in steam inlet piping 38. As the pressure of the steam from the boiler is usually excessively high for the described skin loosening operation, I reduce the pressure in inlet piping 38 to the previously mentioned desired value of about 15 lbs. to 20 lbs. per square inch gauge pressure, by means of any conventional pressure reducing valve 41. The discharge end of the superheater coil 32 is connected by discharge piping 42 to the stream distributing pipe 24 in the housing 2.

As previously related, when the steam is ejected from jets 27 it will fall down to atmospheric pressure because the openings in housing 2 and cylinder 9 are unsealed to the atmosphere; and it will thus lose some heat by expansion of the steam. However, as much heat may be imparted to the steam at the superheater as is required to provide the desired temperature in the steamer sufficiently above 212° F. at atmospheric pressure to produce the desired skin loosening action on the product. The heat imparted to the steam at the superheater may be readily controlled by regulating burner valve 34 to control the quantity of gas combustion. This may be effected through well known automatic controls by means of a thermostat control 43 located in housing 2, and which is connected by suitable means to control automatically opening and closing of burner valve 34, to maintain the steam temperature in housing 2 at a relatively fixed desired temperature. Although I have illustrated a gas burner for superheating the steam, electrical or any other suitable heating means may be utilized in its place.

Some of the skin will be removed in the steamer and will pass through the cylinder openings with the steam condensate which is conducted out through the drain basin 4, but most of the skin will be merely loosened and not removed. Hence, after the skin loosening treatment in the steamer 1, the product is further treated for removal of the skin by spray washing. For this purpose, the discharge chute 22 of steamer 1 conveys the product to a pressure spray washer 44. Except for utilization of water as a washing fluid instead of steam as a skin loosening fluid, the washer is preferably of the same general construction as the steamer, and hence need not be described in detail. It comprises housing 46, foraminated cylinder 47 rotatable therein, in which is longitudinally extending water spray pipe 48, helical conveyor 49 on the inside of cylinder 47, and drain basin 51.

The agitation and conveying of the product in the washer is the same as exists in the steamer. Consequently as the water sprays or jets from water spray pipe 48 impinge against the product at a sufficiently high pressure of the value previously related, the skins are readily removed. The removed skins will pass through the openings in cylinder 47 which are large enough to allow passage of the skins but small enough to prevent passage of the product, and out through drain basin 51. The product from the washer is discharged therefrom by discharge chute 52 which may be connected to any suitable inspection belt (not shown) at which the workmen can readily remove whatever small amount of skin may not have been completely removed in the apparatus.

Figure 3:
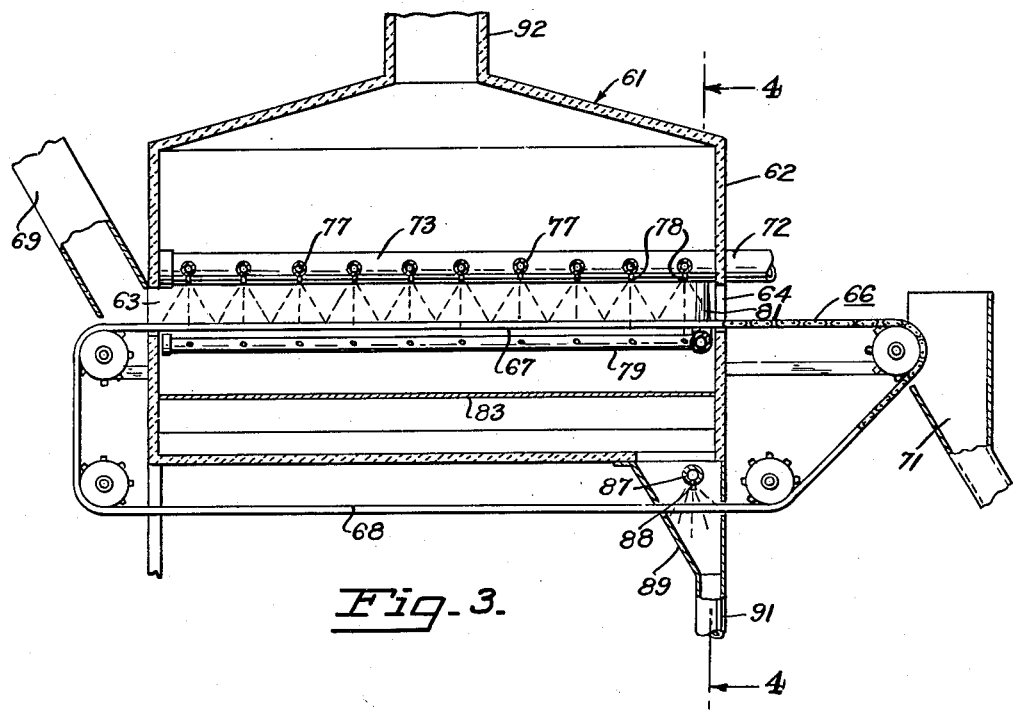
Fig. 3 is a more or less schematic longitudinal section of another embodiment of the apparatus for the peeling of skin from relatively soft products, such as tomatoes.
Figure 4:
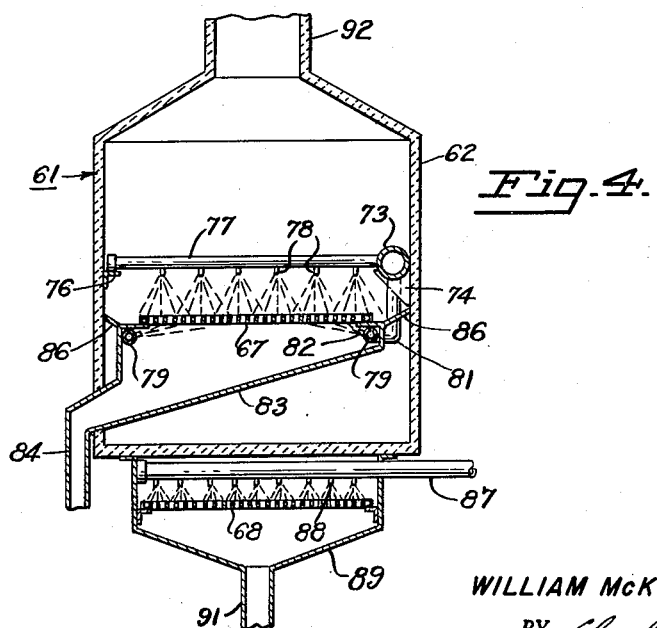
Fig. 4 is a transverse vertical section taken in a plane indicated by line 4—4 in Fig. 3.

For relatively soft products, such as tomatoes, I preferably employ the modification of Figs. 3 and 4, as such modification does not readily bruise these easily injurable products. In such modification of Figs. 3 and 4, the steamer 61 comprises a housing 62 having a product entrance opening 63 at one end, and an exit opening 64 for the product at the opposite end. An endless conveyor 66 having its conveying reach 67 extending through the entrance and exit openings 63 and 64 is provided to convey the product through the housing; the return reach 68 of the conveyor passing underneath housing 62.

To conduct the product to the steamer 61, after it has been preferably washed in the manner mentioned with respect to the previously described modification, a gravity conveying chute 69 is provided to deposit the product onto the conveying reach 67 of the conveyor adjacent entrance 63. A conveying chute 71 is provided at the discharge end of the conveyor 66 for conducting the skin loosened product from the steamer to any suitable washing apparatus (not shown). In this connection if the product is of particularly soft character, such as tomatoes, all that need be done is to pass the product through a water bath in which some of the skin will be removed by the washing, and from which the washed product is conducted to an inspection belt (not shown) whereon the skin may be readily picked off by hand, by the workmen stationed at the belt.

As is the case with the entrance and exit openings of the modification of Figs. 1 and 2, openings 63 and 64 are unsealed to the atmosphere. Consequently, the interior of housing 62 will also be at atmospheric pressure. Superheated steam for effecting loosening of the skin is introduced into the side of housing 62 by means of piping 72; and the steam may be superheated by any suitable means as was described with respect to the modification of Figs. 1 and 2. The endless conveyor 66 is foraminated or open to support the product and at the same time allow the steam to pass through such foraminations or openings. Any suitable type of well known foraminated endless belt conveyor may be employed for this purpose, a preferred type being the well known so-called Laporte flexible steel belt conveyor.

Means is provided to cause the superheated steam introduced into housing 62 to impinge against the product at both sides of the conveying reach 67 of the conveyor, as the product is conveyed through the housing, between the entrance opening 63 and the exit opening 64. For this purpose, piping 72 is connected to a longitudinally extending manifold pipe 73 fixedly supported in housing 62 above conveying reach 67 and at one side thereof, by means of brackets 74. Extending transversely of manifold pipe 73 and connected at one end thereto and at the opposite end fixedly supported on brackets 76, are a plurality of spaced steam distributing pipes 77 which have jets 78 directed to cause jets or sprays of the superheated steam to impinge against the exposed upper parts and the sides of the product.

Steam spraying means is also provided for subjecting the lower parts of the product to the superheated steam which can come in contact with the product by virtue of the foraminated character of the endless conveyor. Such means comprises a U-shaped steam distributing pipe 79 fixedly supported in housing 62 underneath the conveying reach 67 of the conveyor, and which is connected to manifold pipe 73 by means of connecting piping 81; the distributing pipe 79 having a plurality of spaced upwardly inclined jets 82 along the entire length thereof.

A trough or basin 83 is provided in housing 62 underneath the conveying reach 67 of the endless conveyor to collect the steam condensate and conduct it outwardly of the housing by means of a drain discharge spout 84 extending through a side wall of the housing. The upper end of trough 83 is connected to inclined side plates 86 extending to the side walls of housing 62 above the conveying reach 67 of the conveyor, to cause the steam discharged by distributing pipes 77, to be directed only into trough 83 as the steam passes through the openings in the conveyor.

Some of the skin will be removed in the steamer by the steam loosening effect, and may adhere to the conveyor. I, therefore, preferably provide means to wash off such adhered skin. Such means comprises a wash water pipe 87 underneath housing 62 and having a plurality of downwardly directed openings 88 to provide a water spray against the under reach of the conveyor thus washing the adhered skins therefrom. Pipe 87 is located in a housing 89 having a bottom drain spout 91, and through which the under reach 68 of the conveyor passes. Excess steam from housing 62 can escape through vent 92 in the top of the housing.

Figure 5:
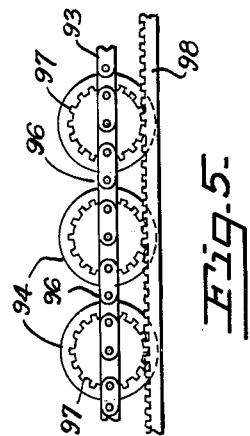
Fig. 5 is a fragmentary longitudinal view of another form of conveyor adapted for the type of apparatus illustrated in Figs. 3 and 4.

If the product is not particularly soft, such as clingstone peaches or apples, mild agitation thereof may also be effected in the type of construction illustrated in Figs. 3 and 4, by the provision of a special form of conveyor which is illustrated in Fig. 5 and which may be substituted for the conveyor shown in Figs. 3 and 4. Such endless conveyor comprises spaced conveyor chains 93 in which are journalled a plurality of transversely and relatively closely spaced rollers 94 which provide the foraminations in the form of openings 96 between the rollers; the spacing being such as to support the product without allowing the product to fall between the rollers. Secured at one end of each of the rollers is a fixed gear 97 which meshes with fixed rack 98 extending longitudinally of the conveying reach of the conveyor at one side thereof. As the conveyor chains 93 are moved, rotation of rollers 94 is effected by virtue of the gears 97 engaging the fixed rack 98. As a result, the product will be thoroughly but mildly agitated so as to enhance loosening of the skins by subjecting all of the surface to the superheated steam spray. At the same time, the construction of Fig. 5 is such as to avoid injury to the relatively soft product because of the mild form of agitation which it effects.

I claim:

Apparatus for peeling a fruit or vegetable product comprising a housing having an entrance and an exit for the product which are unsealed to the atmosphere whereby the housing is at substantially atmospheric pressure, a foraminated cylinder rotatable in said housing and having an interior helical conveyor for continuously conveying the product through the housing and agitating the product upon rotation of the cylinder, piping extending longitudinally of said cylinder and spaced from the axis of said cylinder so as to be positioned relatively close to said helical conveyor, said piping having longitudinally spaced sets of spray nozzles, each set of nozzles being positioned to direct a fluid against the product as it is conveyed through the housing and the nozzles of each set being closely adjacent and disposed substantially radially and angularly relative to each other to cause the fluid to impinge against the product over substantially the entire surface area of support thereof on the interior wall of said cylinder, and means for supplying steam to said nozzles superheated to a temperature sufficiently above 212° F. to loosen the skin from the product.

WILLIAM McK. MARTIN.

REFERENCES CITED

The following references are of record in the file of this patent:

UNITED STATES PATENTS

| Number | Name | Date |
| --- | --- | --- |
| 790,909 | McCann | May 30, 1905 |
| 1,325,847 | Horst | Dec. 23, 1919 |
| 1,374,341 | Vandreuil | Apr. 12, 1921 |
| 1,581,071 | Lowe | Apr. 13, 1926 |
| 1,664,334 | Thompson et al. | Mar. 27, 1928 |
| 1,753,902 | Nevills | Apr. 8, 1930 |
| 1,985,235 | Bizzell | Dec. 25, 1934 |
| 1,992,398 | Ryder | Feb. 26, 1935 |
| 1,999,814 | Knight | Apr. 30, 1935 |
| 2,261,560 | Pellas et al. | Nov. 4, 1941 |
| 2,318,265 | Stagmier | May 4, 1943 |
| 2,424,803 | De Back | July 29, 1947 |